UNITED STATES PATENT OFFICE.

CHARLES C. PARSONS, OF NEW YORK, N. Y.

IMPROVEMENT IN DETERGENTS.

Specification forming part of Letters Patent No. 210,208, dated November 26, 1878; application filed August 7, 1878.

*To all whom it may concern:*

Be it known that I, CHARLES C. PARSONS, of the city, county, and State of New York, have invented a new and useful Cleaning Compound, which compound is fully described in the following specification.

The object of my invention is to better adapt aqua-ammonia for use in the toilet, bath, and laundry without lessening its cleansing qualities.

To prepare the cleansing compound, I take one hundred pounds aqua-ammonia 18° Baumé, and add to it one pound of oleic acid and stir thoroughly; let it stand twelve hours and settle, and it is ready for bottling.

Instead of oleic acid, any other fatty acid that will make a soap soluble in and with aqua-ammonia may be used.

In preparing this compound on the large scale, I have used a very pure article of "red-oil," or commercial or crude oleic acid, with satisfactory results.

The advantages of the cleansing compound over common aqua-ammonia are, that the volatility of the alkali is lessened, so that it may be used more economically, and the caustic and decomposing action of ordinary ammonia on vegetable and animal substances is so much diminished that it may be used far more freely and safely.

I am aware that mixtures of animal and vegetable oils with ammonia have been described and used as liniments and other medicinal preparations; but any mixture of an animal or vegetable oil with ammonia forms, besides the soluble oleates, insoluble amides, and other bodies which entirely destroy its value for cleansing purposes.

I am also aware that oleate of ammonia has been described in chemical works; but no practical or industrial use has ever been made of it, as a solution of it in water contains so little ammonia and so much oleic acid in proportion as to be valueless for cleansing purposes.

I use aqua-ammonia of 18° Baumé and stronger, if wanted, and I have found that when over six (6) per centum of oleic acid is used the mixture becomes a little greasy, and sometimes decomposes and is otherwise objectionable. I have found, on the other hand, that even less than one (1) per centum of oleic acid considerably improves aqua-ammonia in its action upon the skin and clothes.

I claim—

A compound consisting of not more than six (6) per centum of oleic acid and aqua-ammonia, by volume, forming a solution of oleate of ammonia in an excess of aqua-ammonia.

CHARLES CHAUNCY PARSONS.

Witnesses:
    STE. CONEN,
    ALBERT GOETTMANN.